(12) United States Patent
Kim et al.

(10) Patent No.: US 11,742,144 B2
(45) Date of Patent: Aug. 29, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Je Jung Kim, Suwon-si (KR); Su Kyoung Cha, Suwon-si (KR); Ji Won Lee, Suwon-si (KR); Seung Ryeol Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 481 days.

(21) Appl. No.: 16/862,895

(22) Filed: Apr. 30, 2020

(65) Prior Publication Data

US 2021/0183572 A1    Jun. 17, 2021

(30) Foreign Application Priority Data

Dec. 12, 2019    (KR) .......................... 10-2019-0165639

(51) Int. Cl.
*H01G 4/12*    (2006.01)
*H01G 4/012*    (2006.01)
(Continued)

(52) U.S. Cl.
CPC ........... *H01G 4/1227* (2013.01); *H01G 4/012* (2013.01); *H01G 4/0085* (2013.01); *H01G 4/30* (2013.01)

(58) Field of Classification Search
CPC ...... H01G 4/005; H01G 4/008; H01G 4/0085; H01G 4/012; H01G 4/12; H01G 4/1209;
(Continued)

(56) References Cited

U.S. PATENT DOCUMENTS

| 6,270,906 B1* | 8/2001 | Nakamura | H01G 4/0085 |
| | | | 361/321.2 |
| 2014/0153156 A1* | 6/2014 | Park | H01G 4/30 |
| | | | 361/303 |

(Continued)

FOREIGN PATENT DOCUMENTS

| JP | 2001015372 A | * | 1/2001 | .......... H01G 4/1209 |
| JP | 2005145761 A | * | 6/2005 | .......... H01G 4/1209 |

(Continued)

*Primary Examiner* — Nathan Milakovich
(74) *Attorney, Agent, or Firm* — Morgan, Lewis & Bockius LLP

(57) ABSTRACT

A multilayer ceramic electronic component includes a ceramic body including a dielectric layer including a grain and first and second internal electrodes stacked in a third direction with the dielectric layer interposed therebetween, and including a first surface and a second surface opposing each other in a third direction, a third surface and a fourth surface opposing each other in a second direction, and a fifth surface and a sixth surface opposing each other in a first direction; and first and second external electrodes disposed on the fifth surface and the sixth surface of the ceramic body, respectively, and a ratio, G/I, of a particle size, G, of a grain of the dielectric layer to a thickness, I, of each of the first and second internal electrodes is 0.3 or more and 0.5 or less.

17 Claims, 5 Drawing Sheets

(51) Int. Cl.
*H01G 4/30* (2006.01)
*H01G 4/008* (2006.01)

(58) Field of Classification Search
CPC .... H01G 4/1227; H01G 4/232; H01G 4/2325; H01G 4/30
See application file for complete search history.

(56) References Cited

U.S. PATENT DOCUMENTS

| | | | |
|---|---|---|---|
| 2016/0020028 A1* | 1/2016 | Katsuta | H01G 4/2325 361/301.4 |
| 2016/0268045 A1 | 9/2016 | Kaneko et al. | |
| 2017/0186537 A1* | 6/2017 | Park | H01G 4/0085 |

FOREIGN PATENT DOCUMENTS

| | | |
|---|---|---|
| JP | 2015-039037 A | 2/2015 |
| JP | 2016-169130 A | 9/2016 |

* cited by examiner

'B'

MULTILAYER CERAMIC ELECTRONIC COMPONENT

CROSS-REFERENCE TO RELATED APPLICATION(S)

This application claims benefit of priority to Korean Patent Application No. 10-2019-0165639 filed on Dec. 12, 2019 in the Korean Intellectual Property Office, the disclosure of which is incorporated herein by reference in its entirety.

BACKGROUND

1. Field

The present disclosure relates to a multilayer ceramic electronic component.

2. Description of Related Art

With the trend for reducing the sizes of electronic products, a multilayer ceramic electronic component has been required to have a reduced size and increased capacity. In accordance with the demand for a reduced size and increased capacity of a multilayer ceramic electronic component, an internal electrode and a dielectric layer of a multilayer ceramic electronic component have also been designed to have a reduced thickness.

A multilayer ceramic electronic component has been increasingly applied in the fields from the field of an IC product to the field of industrial automobile manufacturing. To apply a multilayer ceramic electronic component in various fields, it may be necessary to implement a certain level or higher of performance in unique environments.

However, when a thickness of a multilayer ceramic electronic component decreases, high temperature reliability may become an issue in a component requiring a high rated current, and it may be difficult to improve DC-BIAS properties.

SUMMARY

An aspect of the present disclosure is to provide a multilayer ceramic electronic component having improved high temperature reliability.

Another aspect of the present disclosure is to provide a multilayer ceramic electronic component having improved DC-BIAS properties.

Another aspect of the present disclosure is to provide a multilayer ceramic electronic component having a reduced size and high reliability.

According to an aspect of the present disclosure, a multilayer ceramic electronic component includes a ceramic body including a dielectric layer including a grain and first and second internal electrodes stacked in a third direction with the dielectric layer interposed therebetween, and including a first surface and a second surface opposing each other in a third direction, a third surface and a fourth surface opposing each other in a second direction, and a fifth surface and a sixth surface opposing each other in a first direction; and first and second external electrodes disposed on the fifth surface and the sixth surface of the ceramic body, respectively, and a ratio, G/I, of a particle size, G, of a grain of the dielectric layer to a thickness, I, of each of the first and second internal electrodes is 0.3 or more and 0.5 or less.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
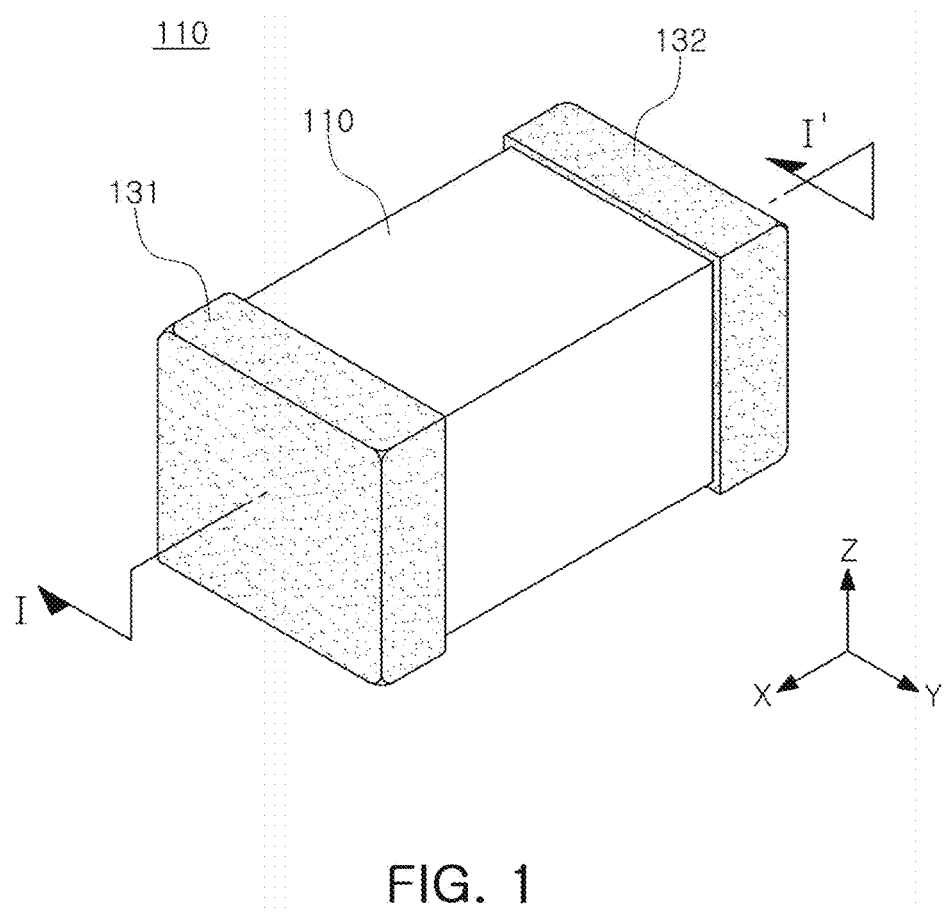
FIG. 1 is a perspective diagram illustrating a multilayer ceramic electronic component according to an example embodiment of the present disclosure.
Figure 2:
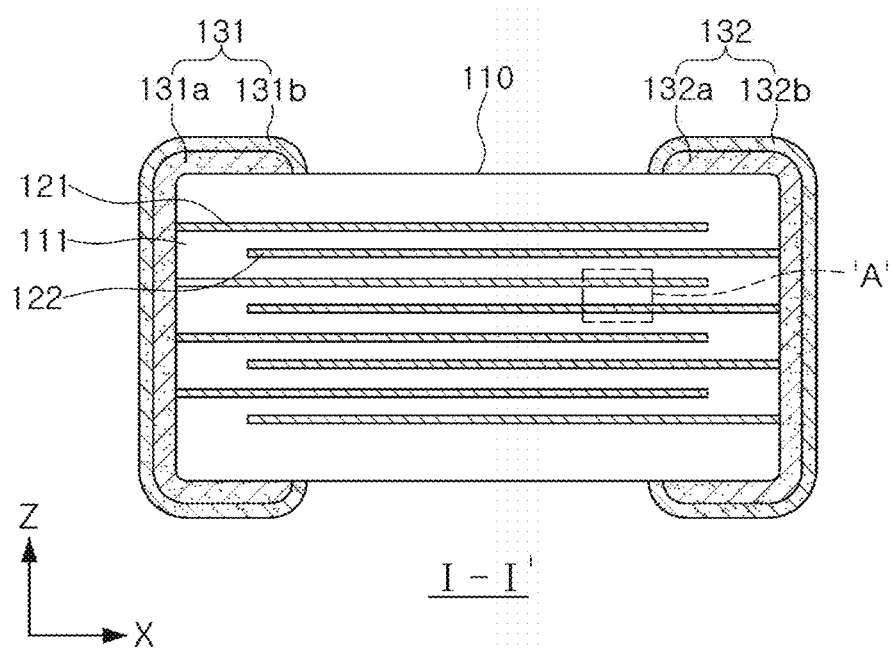
FIG. 2 is a cross-sectional diagram taken along line I-I' in FIG. 1.

Hereinafter, embodiments of the present disclosure will be described as follows with reference to the attached drawings.

It should be understood that the following exemplifying description of the present disclosure is not intended to restrict the present disclosure to specific forms of the present disclosure but rather the present disclosure is meant to cover all modifications, similarities and alternatives which are included in the spirit and scope of the present disclosure. The same elements will be indicated by the same reference numerals.

For clarity of description, some elements may be omitted or briefly illustrated, and thicknesses of elements may be magnified to clearly represent layers and regions.

The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof.

In example embodiments, the expressions "A or B," "at least one of A or/and B," or "one or more of A or/and B" may include any possible combinations with other listed items. For example, "A or B," "at least one of A or/and B," or "one or more of A or/and B" may refer to (1) including at least one A, (2) including at least one B, or (3) including at least one A and at least one B.

In the diagram, an X direction may be defined as a first direction, an L direction, or a length direction, a Y direction may be defined as a second direction, a W direction, or a width direction, and a Z direction may be defined as a third direction, a T direction, or a thickness direction.

In the description below, a multilayer ceramic electronic component will be described in accordance with an example embodiment with reference to FIGS. 1 to 5.

A multilayer ceramic electronic component 100 may include a ceramic body 110 including a dielectric layer 111 including a grain and first and second internal electrodes 121 and 122 stacked in a third direction with the dielectric layer 111 interposed therebetween, and including a first surface and a second surface S1 and S2 opposing each other in the third direction (a Z direction), a third surface and a fourth surface S3 and S4 opposing each other in a second direction (a Y direction), and a fifth surface and a sixth surface S5 and S6 opposing each other in a first direction (an X direction); and first and second external electrodes 131 and 132 disposed on the fifth surface S5 and the sixth surface S6 of the ceramic body 110, respectively.

A ratio (G/I) of a particle size G of a grain of the dielectric layer 111 to a thickness I of each of the first and second internal electrodes 121 and 122 may be 0.3 or more and 0.5 or less. In the example embodiment, a thickness of the internal electrode or the dielectric layer may refer to a length of the internal electrode or the dielectric layer taken in the third direction (a Z direction), and may be an average value of thicknesses of 10 locations. Also, in the example embodiment, a particle size of a grain may refer to a length of the grain taken in the third direction (a Z direction), and may be an average value of particle sizes in 10 locations. The thickness and the particle size may refer to an average of ten thicknesses and ten particle sizes obtained from an X-Z cross-sectional surface of the multilayer ceramic electronic component imaged using a scanning electron microscope (SEM) (e.g., JSM-7400F, an SEM of Jeol), and the average was calculated using an image analysis program (e.g., Image-Pro Plus ver. 4.5 of Mediacybernetics). When the ratio (G/I) of the particle size G of a grain of the dielectric layer 111 to the thickness I of each of the first and second internal electrodes 121 and 122 satisfies the above-mentioned range, improved electrical properties and reliability may be implemented. When the ratio is less than 0.3, high temperature reliability may degrade, and when the ratio exceeds 0.5, an accelerated life and DC-bias properties may degrade.

A shape of the ceramic body 110 may not be limited to any particular shape, and may have a hexahedral shape or a shape similar to a hexahedron, as illustrated in the diagram. Due to contraction of ceramic powder included in the ceramic body 110 during a sintering process, the ceramic body 110 may not have an exact hexahedral shape with straight lines, but may have a substantially hexahedral shape. The ceramic body 110 may have the first and second surfaces S1 and S2 opposing each other in a thickness direction (Z direction), the third and fourth surfaces S3 and S4 connected to the first and second surfaces S1 and S2 and opposing each other in a width direction (Y direction), and the fifth and sixth surfaces S5 and S6 connected to the first and second surfaces S1 and S2 and the third and fourth surfaces S3 and S4 and opposing each other in a length direction (X direction).

The ceramic body 110 may be formed by alternately layering a ceramic green sheet on which the first internal electrode 121 is printed on the dielectric layer 111 and a ceramic green sheet on which the second internal electrode 122 is printed on the dielectric layer 111 in the thickness direction (Z direction).

In the ceramic body 110, the dielectric layer 111 and the first and second internal electrodes 121 and 122 may be alternately layered in the third direction. The plurality of dielectric layers 111 included in the body 110 may be in a sintered state, and the dielectric layers 111 may be integrated such that it may be difficult to identify boundaries between adjacent dielectric layers 111 without using an SEM.

In the example embodiment, a thickness of the ceramic body 110 of the multilayer ceramic electronic component 100 may be 0.8 mm or less. A thickness of the ceramic body 110 may be measured in the third direction (a Z direction) and may be 0.7 mm or less or 0.6 mm or less. A lower limit of the thickness is not limited to any particular size, and may be 0.01 mm or greater, for example. A width of the ceramic body 110 may be measured in the second direction (Y direction), and may be 0.8 mm or less, 0.7 mm or less, or 0.6 mm or less. A lower limit of the width is not limited to any particular size, and may be 0.01 mm or greater, for example. When the ceramic body 110 satisfies the above-mentioned thickness and/or width, a length of the ceramic body 110 may be 1.5 mm or less. A length of the ceramic body 110 may be measured in the first direction (X direction), and may be 1.5 mm or less, 1.4 mm or less, or 1.3 mm or less. A lower limit of the length is not limited to any particular size, and may be 0.01 mm or greater.

Figure 3:
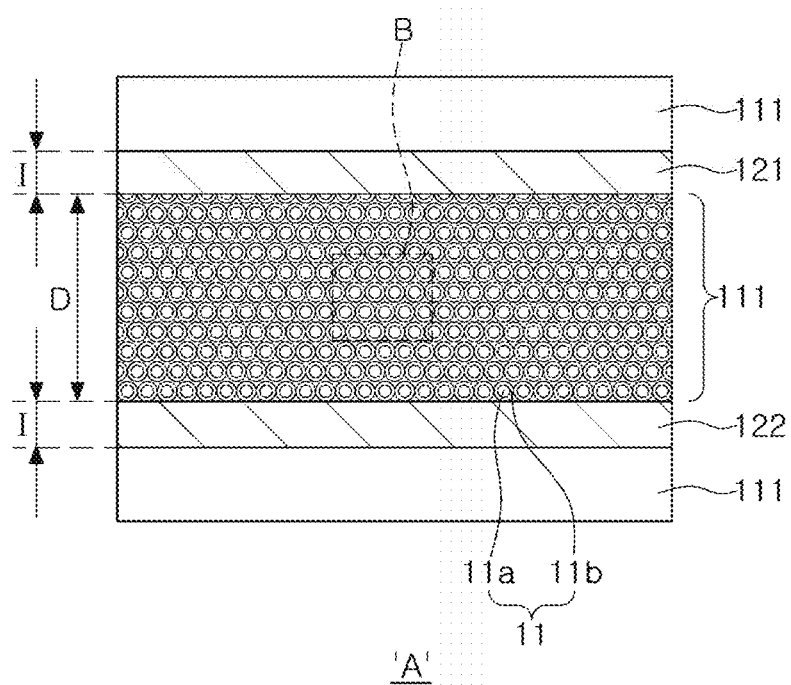
FIG. 3 is an enlarged diagram illustrating region A illustrated in FIG. 2.

In the multilayer ceramic electronic component 100 in the example embodiment, the dielectric layer 111 may include a plurality of grains 11. FIG. 3 is an enlarged diagram illustrating region A illustrated in FIG. 2. As illustrated in FIG. 3, the plurality of grains 11 may be distributed in the dielectric layer 111. The grain 11 may have a core-shell structure in which a main ingredient for forming the dielectric layer 111 is disposed in a central portion 11a. In the example embodiment, the "main ingredient" may refer to an ingredient occupying a relatively great weight ratio as compared to the other ingredients, and may refer to an ingredient of 50 weight % or higher with reference to a total weight of a composition used for forming the dielectric layer or a total weight of a dielectric layer.

Figure 4:
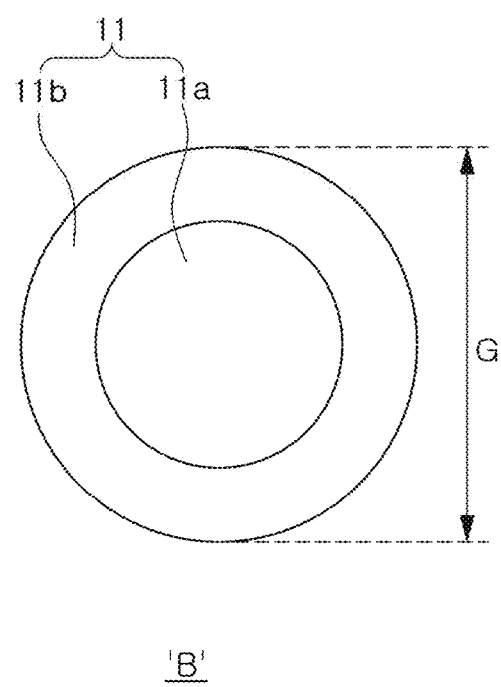
FIG. 4 is a diagram illustrating a grain of region B illustrated in FIG. 3.
Figure 5:
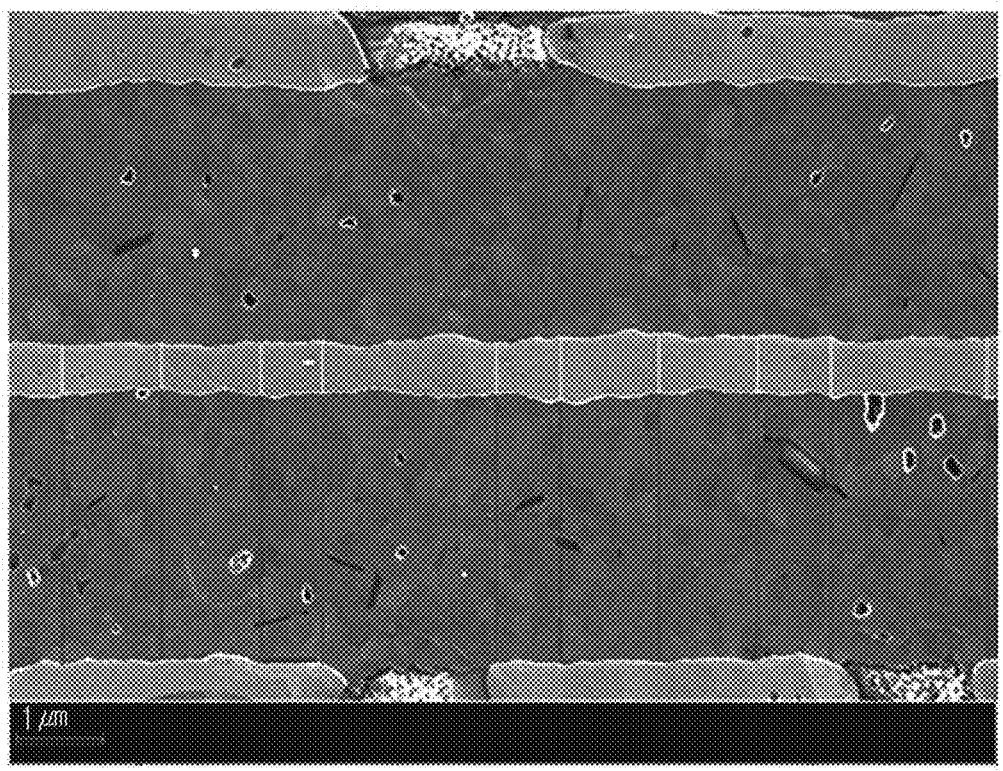
FIG. 5 is an SEM image of a cross-sectional surface of a multilayer ceramic electronic component according to an example embodiment of the present disclosure.

In the example embodiment, a thickness D of the dielectric layer is five times or more of the particle size G of the grain 11 and 20 times or less of the particle size G of the grain 11. FIG. 4 is a diagram illustrating a grain of region B illustrated in FIG. 3. Referring to FIG. 4, the grain 11 may be divided into a core portion 11a and a shell portion 11b. In the example embodiment, the particle size G of the grain may refer to a particle size of a grain including both the core portion 11a and a shell portion 11b. Generally, when a size of the grain 11 increases, a dielectric constant may increase, but DC-bias properties may decrease. In the multilayer ceramic electronic component 100 in the example embodiment, a thickness of the dielectric layer 111 may satisfy the above-mentioned range such that an electronic component having a reduced size and high reliability may be implemented.

In the example embodiment, a material of the dielectric layer 111 may not be limited to any particular material as long as sufficient capacitance can be obtained. For example, the dielectric layer 111 may be formed using a barium titanate material, a Perovskite material compound with lead, a strontium titanate material, or the like.

Also, as the material of the dielectric layer 111, a barium titanate ($BaTiO_3$) powder, or the like, including various ceramic additives, organic solvents, coupling agents, dispersing agents, and the like, may be used depending on an intended purpose.

For example, the dielectric layer 111 may be formed by disposing a plurality of ceramic sheets formed by applying slurry including powder such as barium titanate ($BaTiO_3$) on a carrier film and drying the slurry. The ceramic sheet may be formed by manufacturing slurry formed from a mixture of a ceramic powder, a binder, and a solvent and manufacturing a sheet having a thickness of a several μm using the slurry through a doctor blade process.

The multilayer ceramic electronic component in the example embodiment may include a cover portion. The cover portion may be disposed in an outermost region of each of the first and second internal electrodes 121 and 122. The cover portion may be disposed on a lower portion of a lowermost internal electrode and an upper portion of an uppermost internal electrode. The cover portion may have a composition the same as a composition of the dielectric layer 111, and may be formed by layering at least one dielectric layer which does not include an internal electrode on the upper portion of an uppermost internal electrode and the lower portion of a lowermost internal electrode of the ceramic body 110. The cover portion may prevent damage to an internal electrode caused by physical or chemical stress.

In the multilayer ceramic electronic component in the example embodiment, margin portions may be disposed on both surfaces of the ceramic body 110 in the second direction. The margin portions may be disposed on both surfaces of the ceramic body 110 taken in the second direction (Y direction) perpendicular to the first and third directions (X direction and Z direction), respectively. The margin portions may prevent damage to an internal electrode caused by physical or chemical stress.

The margin portions may be formed of an insulating material, and may be formed of a ceramic material such as barium titanate, or the like. In this case, the margin portions may include a ceramic material the same as a ceramic material included in the dielectric layer 111, or may be formed of a material the same as a material of the dielectric layer 111.

A method of forming the margin portions is not limited to any particular method. For example, an area of the dielectric layer included in the ceramic body 110 may be configured to be greater than an area of the internal electrode, and a margin region may be formed on a circumferential portion of the internal electrode other than a portion connected to the external electrode, may be formed by applying a slurry including a ceramic, or may be formed by attaching a dielectric sheet on both surfaces of the ceramic body 110 taken in the second direction (Y direction).

In the multilayer ceramic electronic component 100 in the example embodiment, the internal electrodes 121 and 122 may be alternately layered to oppose each other with the dielectric layer 111 interposed therebetween. The internal electrodes 121 and 122 may include the first and second internal electrodes 121 and 122 alternately disposed to oppose each other with the dielectric layer 111 interposed therebetween. The first and second internal electrodes 121 and 122 may be electrically separated from each other by the dielectric layer 111 interposed therebetween.

In an example embodiment, an average thickness of the first and second internal electrodes 121 and 122 of the multilayer ceramic electronic component 100 may be 0.4 μm or less. The average thickness of the first and second internal electrodes 121 and 122 may be an average of thicknesses of five different locations of a sintered internal electrode. A lower limit of the average thickness of the first and second internal electrodes 121 and 122 is not limited to any particular size, and may be 0.01 μm or higher.

In the example embodiment, the first and second internal electrodes 121 and 122 may contain nickel (Ni) in the highest amount, but an example embodiment thereof is not limited thereto. The first and second internal electrodes 121 and 122 may be formed using a conductive paste including one or more materials selected from the group consisting of silver (Ag), palladium (Pd), gold (Au), platinum (Pt), copper (Cu), tin (Sn), tungsten (W), titanium (Ti), and alloys thereof. As a method of printing the conductive paste, a screen-printing method, a gravure printing method, or the like, may be used, but the printing method is not limited thereto.

In the multilayer ceramic electronic component 100 in the example embodiment, the first external electrode 131 and the second external electrode 132 may be disposed on the fifth surface S5 and the sixth surface S6 of the ceramic body 110 in the first direction (X direction), respectively. The first external electrode 131 may be connected to the first internal electrode 121, and the second external electrode 132 may be connected to the second internal electrode 122. The first internal electrode 121 may be exposed to one surface of the ceramic body 110 taken in the first direction (X direction), and the portion exposed to the one surface taken in the first direction (X direction) may be connected to the first external electrode 131. The second internal electrode 122 may be exposed to the other surface of the ceramic body 110 taken in the first direction (X direction), and the portion exposed to the other surface taken in the first direction (X direction) may be connected to the second external electrode 132.

In the example embodiment, the first external electrode 131 of the multilayer ceramic electronic component 100 may include a first base electrode 131a and a first terminal electrode 131b. The second external electrode 132 may include a second base electrode 132a and a second terminal electrode 132b. The first and second base electrodes 131a and 132a may be connected to the first and second internal electrodes 121 and 122, respectively, and may be disposed on the fifth surface S5 and the sixth surface S6 of the ceramic body 110, respectively.

The first and second base electrodes 131a and 132a may be formed of a conductive paste including a first conductive metal and glass. The first and second base electrodes 131a and 132a may include copper (Cu) the most, but an example embodiment thereof is not limited thereto. For example, the first and second base electrodes 131a and 132a may be formed using a conductive paste including one or more materials from among silver (Ag), palladium (Pd), gold (Au), platinum (Pt), nickel (Ni), tin (Sn), tungsten (W), palladium (Pd), titanium (Ti), and alloys thereof and glass.

The glass may be one material selected from a group consisting of silicone (Si), boron (B), aluminum (Al), a transition metal, an alkali metal, an alkali earth metal, an oxide, a nitride, a carbide, and a carbonate thereof, but an example of the glass is not limited thereto. The transition metal may be selected from a group consisting of zinc (Zn), titanium (Ti), copper (Cu), vanadium (V), manganese (Mn), iron (Fe), and nickel (Ni), the alkali metal may be selected from a group consisting of lithium (Li), sodium (Na), potassium (K), and the alkali earth metal may be selected from a group consisting of manganese (Mn), calcium (Ca), strontium (Sr), and barium (Ba).

A method of forming the first and second base electrodes 131a and 132a is not limited to any particular method. For example, various methods such as a method of printing or applying conductive paste including a first conductive metal and glass on a surface of the ceramic body 110 by a screen printing method or a gravure printing method, a method of dipping the ceramic body 110 in the conductive paste, or a method of transferring a dried film formed by drying the conductive paste on the ceramic body 110 may be used, but an example of the method is not limited thereto. By forming the first and second base electrodes 131a and 132a using the above-mentioned conductive paste, sufficient conductivity may be maintained, and density of the external electrode may increase due to added glass such that permeation of a plating solution or external moisture may be prevented effectively.

In the example embodiment, the first terminal electrode 131b and the second terminal electrode 132b may be disposed on the first base electrode 131a and the second base electrode 132a of the multilayer ceramic electronic component 100, respectively. The first terminal electrode 131b and the second terminal electrode 132b may be configured to cover the first base electrode 131a and the second base electrode 132a, respectively. In the example embodiment, the configuration in which the first and second terminal electrodes 131b and 132b are configured to cover the first and second base electrodes 131a and 132a may indicate that the first and second terminal electrodes 131b and 132b may be disposed while preventing the first and second base electrodes 131a and 132a from being externally exposed, and that the first base electrode 131a and the second base electrode 132a are disposed in the first external electrode 131 and the second external electrode 132, respectively, such that only the first terminal electrode 131b and the second terminal electrode 132b may be seen from the outside.

In the example embodiment, the first and second terminal electrodes 131b and 132b disposed on the first and second base electrodes 131a and 132a may be configured as conductive resin layers. The conductive resin layers may include a second conductive metal and a base resin. The conductive resin layer may be formed using a conductive paste used for an external electrode, which includes second conductive metal particles and a base resin.

The conductive resin layer may include a second conductive metal, and the second conductive metal may have a powder form. A shape of a particle of the second conductive metal powder may be a spherical shape or a flake shape. The second conductive metals may be in contact with each other or may be disposed adjacent to each other in the conductive resin layer, and the base resin may be configured to surround the metal particles.

As the second conductive metal, any metal particles having excellent conductivity may be used. For example, the second conductive metal may include a conductive metal selected from the group consisting of copper (Cu), nickel (Ni), tin (Sn), palladium (Pd), platinum (Pt), gold (Au), silver (Ag), tungsten (W), titanium (Ti), lead (Pd), and alloys thereof.

The base resin may be configured as a thermosetting resin. A thermosetting resin may not be limited to any particular example, and as an example, although not limited thereto, the thermosetting resin may include phenolic resin, urea resin, diallylphthalate resin, melamine resin, guanamine resin, unsaturated polyester resin, polyurethane resin, epoxy resin, aminoalkyd resin, melamine-urea co-polymerized resin, silicone resin, siloxane resin, or the like, but an example embodiment thereof is not limited thereto. When a thermosetting resin is used, a cross-linking agent, a curing agent such as a polymerization initiator, a polymerization promoter, a solvent, a viscosity modifier, or the like, may be added.

The first and second terminal electrodes 131b and 132b disposed on the first and second base electrodes 131a and 132a may be configured as conductive resin layers such that the multilayer ceramic electronic component may be protected from external thermal, chemical, and physical stress, permeation of moisture into the ceramic body may be prevented, and permeation of a plating solution into the ceramic body when a plating layer is formed may be prevented. Accordingly, moisture resistance reliability of the multilayer ceramic electronic component may improve.

In the example embodiment, a capacitance change rate of the multilayer ceramic electronic component may be ±15% or less at a temperature of −55° C. or more and 150° C. or less. In the example embodiment, the capacitance change rate may refer to a capacitance change rate within the above-mentioned temperature range with reference to a reference capacitance of 25° C., and may refer to a capacitance change rate prescribed by EIA RS-198, an electronic industries alliance (EIA) standard for a Class II capacitor. Accordingly, the multilayer ceramic electronic component may satisfy a X8R standard.

In another example embodiment, an a DC-bias change rate of the multilayer ceramic electronic component after 3 V/μm of a direct current voltage is applied for 60 seconds may be ±5% or less. The above-mentioned change rate may be ±5% or less, ±4.5% or less, ±4.0% or less, ±3.5% or less, or ±3.0% or less. A lower limit thereof may not be limited to any particular example, and may be ±0% or higher or higher than ±0%, for example. In the example embodiment, DC-bias may refer to a characteristic in which a capacitance value changes by applying a direct current voltage, and a DC-bias change rate may refer to a degree of change of a capacitance value by applying a direct current voltage. The DC-bias change rate may refer to a change rate after 3 V/μm of a direct current voltage is applied with reference to a reference capacitance of 25° C. As for a capacitance change caused by applying a direct current voltage, the higher the strength of an electrical field caused by a direct current, the more the degradation of capacitance caused by a DC-bias phenomenon may increase. Accordingly, the more the size of a multilayer ceramic electronic component is reduced and the more the thickness of each of an internal electrode and a dielectric layer is reduced, the more the capacitance change rate may increase even when the same level of a voltage is applied. In the multilayer ceramic electronic component in the example embodiment, by adjusting a ratio of a particle size of a grain of the dielectric layer to a thickness of the internal electrode to be within a specific range as described above, even when a dielectric layer having a reduced thickness is applied to a small-sized chip, DC-bias properties may improve.

In the description below, the present disclosure will be described in greater detail with reference to an experimental example, but an example embodiment thereof is not limited thereto.

Experimental Example

Tables 1 and 2 list a result of DC-bias and a result of high temperature reliability in relation to a prototype multilayer ceramic electronic component (prototype MLCC) having a 1005 size.

Samples in Tables 1 and 2 were manufactured as below. Raw material powder including barium titanate $BaTiO_3$ as a main ingredient, ethanol/toluene, a dispersing agent, and a binder were mixed using a zirconia ball as a mixing/dispersing medium, the mixture was ball-milled, thereby preparing a slurry.

Using the prepared slurry, a forming sheet having a thickness of 0.2 μm was manufactured using a coater based on a doctor blade method. An Ni-internal electrode was printed on the forming sheet. Upper and lower covers were manufactured by layering 25 sheets used for a cover, and the sheets were layered while pressure was applied to a 21st printed active sheet, thereby manufacturing a bar. A compressive bar was cut out as chips each having a size of 1.0 mm×0.5 mm using a cutter.

The chip having a 1005 size manufactured as above was baked out, the chip was sintered at a temperature of 1200 to 1250° C. in a reducing atmosphere of 1.0% $H_2$/99.0% $N_2$ (atmosphere of $H_2O/H_2/N_2$) for two hours, reoxidation was performed in an atmosphere of $N_2$ at 1000° C. for three hours, and heat treatment was performed. Abase electrode was sintered using Cu paste with respect to the sintered chip, a terminal electrode was formed using paste prepared by mixing copper powder with epoxy resin, thereby manufacturing an external electrode.

A ratio of a particle size of a grain of a dielectric layer to a thickness of an internal electrode in a final chip was modified by adjusting a particle size of barium titanate ($BaTiO_3$) powder, raw material powder.

TABLE 1

| DC-bias [V] | G/I 0.2 | 0.3 | 0.4 | 0.5 | 0.6 |
|---|---|---|---|---|---|
| 0 | 0.00% | 0.00% | 0.00% | 0.00% | 0.00% |
| 1 | 0.40% | 3.20% | 3.30% | 3.20% | 4.70% |
| 2 | −1.10% | 3.70% | 3.80% | 3.80% | 1.70% |
| 3 | −4.60% | 0.10% | 0.10% | −0.10% | −9.90% |
| 4 | −9.20% | −5.50% | −5.60% | −6.00% | −22.80% |
| 5 | −14.30% | −11.90% | −12.20% | −12.80% | −34.30% |
| 6.3 | −21.00% | −20.70% | −21.20% | −21.80% | −45.90% |
| 8 | −29.80% | −31.40% | −32.00% | −32.90% | −56.90% |
| 12.5 | −49.90% | −53.10% | −53.90% | −54.60% | −73.00% |
| 16 | −55.30% | −64.00% | −64.60% | −65.10% | −79.40% |
| 25 | −77.80% | −78.80% | −79.00% | −79.30% | −87.30% |

Table 1 indicates a DC-bias change rate in accordance with a ratio (G/I) of a particle size G of a grain of the dielectric layer D to a thickness I of the internal electrode. The change rate was obtained by, after applying a voltage of 0 V/μm to 25 V/μm for 60 seconds, measuring a capacitance change rate using an LCR-meter.

As indicated in Table 1 above, a significant difference of the values of the capacitance change was observed in the value of the ratio (G/I) of the particle size G of a grain of the dielectric layer D to the thickness I of the internal electrode at from 0.3 to 0.5, and when the ratio (G/I) was included in the range of 0.3 to 0.5, DC-bias properties improved.

TABLE 2

| G/I | 0.2:1 | 0.3:1 | 0.4:1 | 0.5:1 | 0.6:1 | 0.7:1 |
|---|---|---|---|---|---|---|
| LOT1 | 2/100 | 0/100 | 0/100 | 0/100 | 21/100 | 100/100 |
| LOT2 | 1/100 | 0/100 | 0/100 | 0/100 | 18/100 | 100/100 |
| LOT3 | 3/100 | 0/100 | 0/100 | 0/100 | 17/100 | 100/100 |

Table 2 above lists a result of a ratio (G/I) of the particle size G of a grain of the dielectric layer D to the thickness I of the internal electrode and a result of a high temperature reliability test. In the high temperature reliability test, the number of defects was observed when a voltage of 1.5 VR was applied at a temperature of 150° C. and humidity of 50% RH for 100 hours.

As indicated in Table 2 above, it was observed that defects occurred in the ratio (G/I) of the particle size G of a grain of the dielectric layer D to the thickness I of the internal electrode from 0.3 and 0.5. Accordingly, it has been indicated that, when the ratio (G/I) was included in the range of 0.3 to 0.5, high temperature reliability was improved.

According to the aforementioned example embodiments, a multilayer ceramic electronic component having improved high temperature reliability may be provided.

Also, a multilayer ceramic electronic component having improved DC-BIAS properties may be provided.

Also, a multilayer ceramic electronic component having a reduced size and improved reliability may be provided.

While the example embodiments have been shown and described above, it will be apparent to those skilled in the art that modifications and variations could be made without departing from the scope of the present disclosure as defined by the appended claims.

What is claimed is:

1. A multilayer ceramic electronic component, comprising:
a ceramic body including a dielectric layer including a grain and first and second internal electrodes stacked in a third direction with the dielectric layer interposed therebetween, and including a first surface and a second surface opposing each other in a third direction, a third surface and a fourth surface opposing each other in a second direction, and a fifth surface and a sixth surface opposing each other in a first direction; and
first and second external electrodes disposed on the fifth surface and the sixth surface of the ceramic body, respectively,
wherein a ratio, G/I, of a particle size, G, of the grain of the dielectric layer to a thickness, I, of each of the first and second internal electrodes is 0.3 or more and less than 0.5,
a thickness, D, of the dielectric layer is five times or more of the particle size, G, of the grain and 20 times or less of the particle size, G, of the grain,
an average thickness of the first and second internal electrodes is 0.4 μm or less, and
a thickness of the ceramic body is 0.8 mm or less.

2. The multilayer ceramic electronic component of claim 1, wherein the first and second internal electrodes include nickel (Ni).

3. The multilayer ceramic electronic component of claim 1, wherein the first and second external electrodes include first and second base electrodes connected to the first and second internal electrodes, and first and second terminal electrodes covering the first and second base electrodes, respectively.

4. The multilayer ceramic electronic component of claim 3, wherein the first and second base electrodes include a conductive metal and glass.

5. The multilayer ceramic electronic component of claim 3, wherein the first and second terminal electrodes include conductive resin layers.

6. The multilayer ceramic electronic component of claim 5, wherein the conductive resin layer includes a second conductive metal selected from the group consisting of tin (Sn), palladium (Pd), platinum (Pt), gold (Au), tungsten (W), titanium (Ti), lead (Pd), and alloys thereof.

7. The multilayer ceramic electronic component of claim 1, wherein a capacitance change rate is ±15% or less at a temperature of −55° C. or more and 150° C. or less.

8. The multilayer ceramic electronic component of claim 1, wherein a DC-bias change rate after 3 V/μm of a direct current voltage is applied for 60 seconds is ±5% or less.

9. The multilayer ceramic electronic component of claim 1, wherein the dielectric layer comprises a barium titanate material.

10. The multilayer ceramic electronic component of claim 1, wherein the dielectric layer comprises a Perovskite material compound.

11. The multilayer ceramic electronic component of claim 1, wherein a DC-bias change rate after 3 V/μm of a direct current voltage is applied for 60 seconds is ±4.5% or less.

12. The multilayer ceramic electronic component of claim 1, wherein a DC-bias change rate after 3 V/μm of a direct current voltage is applied for 60 seconds is ±4.0% or less.

13. The multilayer ceramic electronic component of claim 1, wherein a DC-bias change rate after 3 V/μm of a direct current voltage is applied for 60 seconds is ±3.5% or less.

14. The multilayer ceramic electronic component of claim 1, wherein a DC-bias change rate after 3 V/μm of a direct current voltage is applied for 60 seconds is ±3.0% or less.

15. The multilayer ceramic electronic component of claim 1, wherein the first and second internal electrodes include at least one selected from the group consisting of silver (Ag), palladium (Pd), gold (Au), platinum (Pt), copper (Cu), tin (Sn), tungsten (W), titanium (Ti), and alloys thereof.

16. The multilayer ceramic electronic component of claim 1, wherein the ratio G/I is 0.3 or more and 0.4 or less.

17. The multilayer ceramic electronic component of claim 1, wherein the length of the ceramic body is 1.5 mm or less and the width of the ceramic body is 0.8 mm or less.

\* \* \* \* \*